May 20, 1947.  H. BARRAS  2,420,767
CLUTCH CONTROLLING DEVICE
Original Filed April 25, 1944
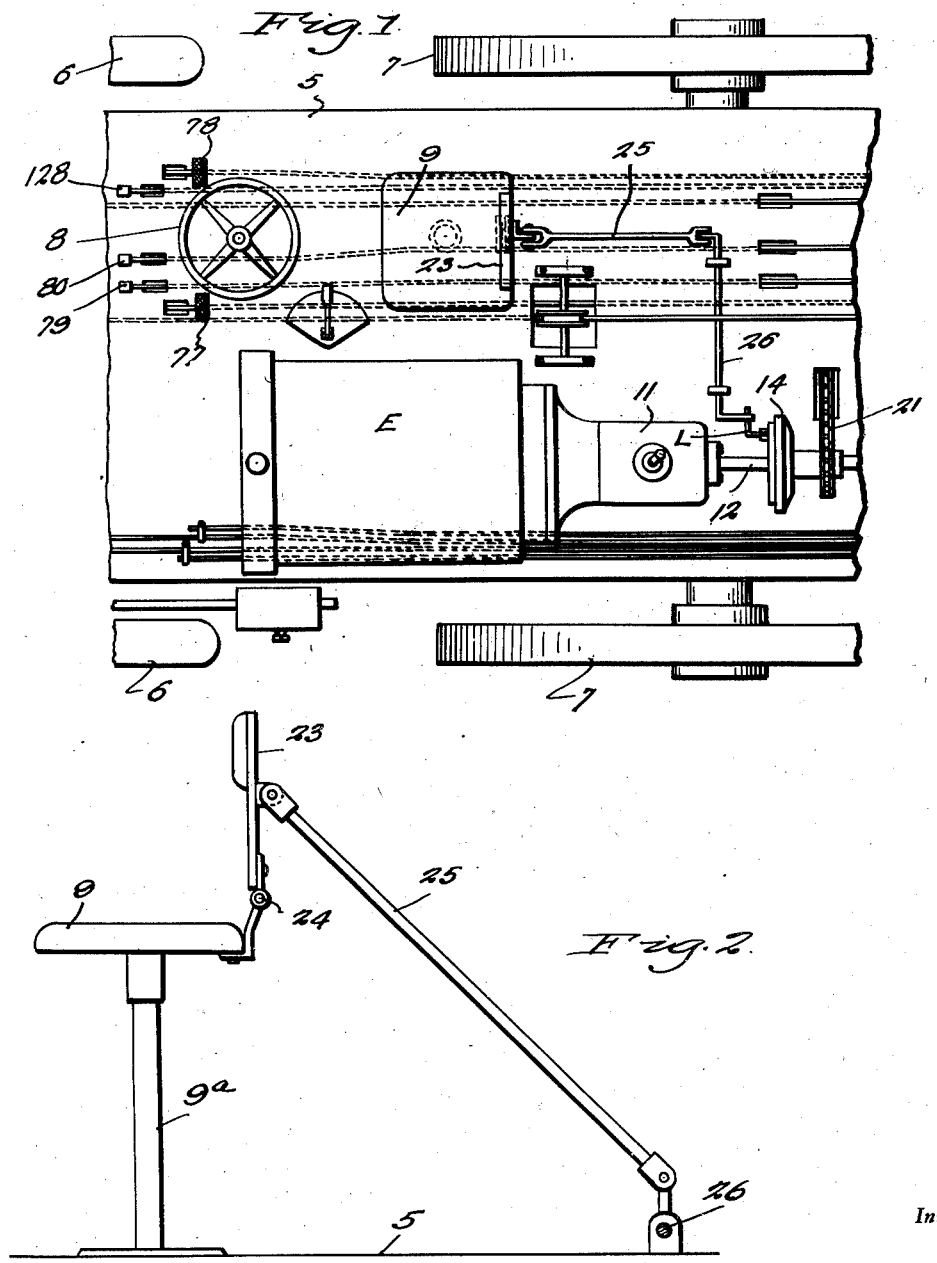
Inventor
Herbert Barras
By Clarence A. O'Brien
and Harvey B. Jacobson
Attorneys Patented May 20, 1947

2,420,767

UNITED STATES PATENT OFFICE 2,420,767

CLUTCH CONTROLLING DEVICE

Herbert Barras, Baldwin, La.

Original application April 25, 1944, Serial No. 532,622. Divided and this application February 16, 1945, Serial No. 578,277

3 Claims. (Cl. 180—77)

This invention relates to a controlling device for power-operated machines, and the present application is a division of my application for U. S. Letters Patent Serial No. 532,622, filed April 25, 1944, and now Patent No. 2,375,205, issued May 8, 1945, upon Piling and loading machine.

Broadly stated, the present invention contemplates the provision of a device whereby the operator of a power-driven machine may readily and effectively actuate a control member of the machine by leaning backwardly while occupying the operator's seat of the machine.

More specifically, the present invention contemplates the provision of a device of the above kind for use in connection with machines having other control members requiring use of both hands and both feet of the operator and making it necessary to provide means, operable other than by the feet or hands, for actuating the control member in question.

Still more specifically, the present invention contemplates the provision of a controlling device of the above kind for use in connection with a portable machine embodying a motor vehicle having an engine, driving and supporting wheels, and a normally disengaged clutch for controlling transmission of power from the engine to said driving and supporting wheels, the device including a rearwardly yielding member disposed to engage the back of the operator when occupying the operator's seat of the machine and operatively connected to the operating or control lever of the clutch for engaging the latter and causing travel of the machine when the yieldable member is moved rearwardly by the mere act of leaning backwardly on the part of the operator.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts in both of the views:

Figure 1 is a fragmentary plan view of a piling and loading machine equipped with a controlling device constructed in accordance with the present invention, and Figure 2 is an enlarged side elevational view of the operator's seat of the machine shown in Figure 1, together with part of the means for operatively connecting the back rest of said seat with the main clutch which transmits power from the engine of the machine to the various mechanisms of the latter.

Referring in detail to the drawings, the present invention is shown as applied to a piling and loading machine of the type disclosed in my above-mentioned application, which machine includes a motor vehicle having a bed or platform 5 mounted upon a suitable running gear including front steering and supporting wheels 6 and rear supporting and driving wheels 7. A steering wheel 8 forming part of a suitable or conventional steering mechanism is provided for turning the wheels 6 to steer the vehicle. A seat for the operator of the machine is provided on the platform 5 directly behind the steering wheel 8 and may include a seat bottom 9 mounted on a pedestal or standard 9a. Mounted on the platform 5 is a suitable engine E which, through the medium of an ordinary automobile transmission 11, drives a rearwardly extending shaft 12. A normally disengaged clutch 14 is provided on shaft 12 and includes a part that is normally free of shaft 12 and operatively connected by means including a chain gearing 21 to the wheels 7, as disclosed in my above-mentioned application. The clutch 14 has a second part keyed on shaft 12 and adapted to be actuated for engaging with the first-mentioned part so as to transmit the drive from shaft 12 to gearing 21.

For actuating the clutch 14 to engage it, said clutch is operatively connected to a back rest or other suitable rearwardly yieldable member 23 arranged to engage the back of the operator occupying the operator's seat, so that when the operator leans back, engagement of clutch 14 is effected. For this purpose, the back rest 23 may be hinged at 24 to the rear of the seat bottom 9 and for forward and rearward swinging movement, said back rest being operatively connected by a link 25 with one end of a rock shaft 26 whose other end is operatively connected to the operating lever L of the clutch 14. As is the case with a normally disengaged clutch, internal spring means is provided for disengaging it, and this means acts to normally position the back rest 23 in a forwardly swung position. Therefore, by simply pressing rearwardly on the back rest 23, the operator may effect engagement of clutch 14 so as to transmit drive from shaft 12 to chain gearing 21 and effect travel of the machine. This is of extreme importance in cases where it is necessary to have the operator's hands free for other duties, or where both hands and both feet of the operator are occupied in actuating other control members of the machine, such as those indicated at 77, 78, 79, 80 and 128.

While a complete and preferably hinged back rest is preferably employed at 23, the member 23 may take other forms and may be supported other than by the hinge mounting 24. Also, the specific operative connection between the member 23 and the control lever L may be widely varied.

In operation, the operator normally leans forwardly when occupying the operator's seat so as to allow clutch 14 to assume its normal disengaged position. However, when travel of the machine is desired, it is simply necessary for the operator to lean rearwardly so as to swing the back rest 23 rearwardly and thereby actuate the lever L through the connections described. In this way, the clutch 14 is readily engaged so as to transmit power from the engine E to the wheels 7 through the means including chain gearing 21. When forward travel of the machine is no longer desired, the clutch 14 is allowed to disengage by simply leaning forwardly and thereby relieving pressure on the back rest 23.

From the foregoing description, it is believed that the construction and operation, as well as the advantages of the present invention, will be readily understood and appreciated by those skilled in the art. Changes in details of construction illustrated and described may be resorted to, such as fall within the spirit and scope of the invention as claimed.

What I claim is:

1. In combination with a power-driven machine having an operator's seat and including mechanism, a motor, and a normally disengaged clutch engageable for connecting and transmitting power from the engine to said mechanism, said operator's seat including a fixed seat bottom, said clutch including an operating lever, a rearwardly yieldable member arranged to engage the back of the operator when seated upon the seat bottom, and means operatively connecting said yieldable member with said operating lever, whereby the yieldable member will be moved rearwardly by the mere act of the operator leaning backwardly to effect engagement of the clutch, and whereby the yieldable member will be moved forward by disengagement of the clutch when the operator leans forwardly.

2. In combination with a power-operated machine including a driver's seat having a back rest hinged for forward and rearward swinging, and wherein the machine further includes mechanism, an engine, and a normally disengaged clutch engageable for connecting and transmitting power from the engine to said mechanism, said clutch including an operating lever, and means operatively connecting the back rest to said operating lever for effecting engagement of the clutch upon rearward movement of the back rest in response to backward leaning of the operator occupying the seat, and whereby the back rest will be moved forwardly by disengagement of the clutch when the operator leans forwardly.

3. In combination with a power-operated machine including a driver's seat having a back rest hinged for forward and rearward swinging movement, and wherein the machine further includes mechanism, an engine, and a normally disengaged clutch engageable for connecting and transmitting power from the engine to said mechanism, said clutch including an operating lever, and means operatively connecting the back rest to said operating lever for effecting engagement of the clutch upon rearward movement of the back rest in response to backward leaning of the operator occupying the seat, said means for operatively connecting the back rest to the operating lever including a link, a rock shaft disposed transversely of the machine and operatively connected at one end to one end of the link and at its other end to the operating lever, the other end of said link being pivoted to the back rest.

HERBERT BARRAS.

REFERENCES CITED

The following references are of record in the file of this patent:

UNITED STATES PATENTS

| Number | Name | Date |
|---|---|---|
| 1,582,879 | Midboe | Apr. 27, 1926 |
| 2,256,238 | Brown | Sept. 16, 1941 |
| 2,080,196 | Bowen | May 11, 1937 |
| 1,541,541 | Weiss | June 9, 1925 |
| 2,130,877 | Curry | Sept. 20, 1938 |

FOREIGN PATENTS

| Number | Country | Date |
|---|---|---|
| 479,864 | France | Feb. 21, 1916 |